United States Patent [19]

Lakey

[11] Patent Number: 4,800,916

[45] Date of Patent: Jan. 31, 1989

[54] HEDGE HOSE BIBB EXTENSION APPARATUS

[76] Inventor: Larry D. Lakey, 4628 O'Connor Ct., Country Club Pl., Irving, Tex. 75062

[21] Appl. No.: 84,638

[22] Filed: Aug. 11, 1987

[51] Int. Cl.$^4$ .............................................. F16L 3/00
[52] U.S. Cl. ................................ 137/343; 239/276; 248/87; 285/161; 285/256
[58] Field of Search ............... 137/343; 285/161, 252, 285/253, 256; 248/87, 75, 76; 239/276

[56] References Cited

U.S. PATENT DOCUMENTS

| | | | |
|---|---|---|---|
| 510,496 | 12/1893 | Anderson | 239/222.19 |
| 682,590 | 9/1901 | Greer | 239/276 |
| 691,651 | 1/1902 | Murrill | 239/530 |
| 1,031,176 | 7/1912 | Gilpin | 239/285 |
| 1,249,838 | 12/1917 | Schneider | 239/276 |
| 1,278,774 | 9/1918 | Smith | 239/276 |
| 1,743,537 | 1/1930 | Freese | 248/87 |
| 2,607,622 | 8/1952 | Doepke | 299/47 |
| 2,757,962 | 8/1956 | MacLeod | 239/276 |
| 2,830,614 | 4/1958 | Pralle | 137/356 |
| 3,017,203 | 1/1962 | MacLeod | 285/256 |
| 3,351,290 | 11/1967 | Baldwin | 239/276 |
| 3,368,831 | 2/1968 | Phillips | 285/161 |
| 3,473,770 | 10/1969 | Edgerton | 248/87 |

*Primary Examiner*—A. Michael Chambers
*Attorney, Agent, or Firm*—Hubbard, Thurman, Turner & Tucker

[57] ABSTRACT

A hose bibb extension assembly includes a specially designed mounted stake adapted to be pushed into the ground in front of a hedge or the like positioned closely adjacent a wall-mounted hose bibb and impeding access thereto. A hose barb fitting is firmly anchored to an upper end portion of the stake and couples the inlet of an auxiliary hose bibb to the outlet end of a high pressure extension hose. By connecting the inlet end of the extension hose to the wall-mounted, primary hose bibb, and turning and leaving such hose bibb on, the stake-supported auxiliary hose bibb may be coupled to a lawn watering hose and be conveniently used to control water flow thereto without the previous necessity of reaching under, through or over the obstructing hedge to operate the primary hose bibb. The stake, when driven into the ground, securely mounts the auxiliary hose bibb in a convenient elevated position, and has a generally L-shaped cross-section which stabilizes the stake against tilting or axial rotation in the ground. One of the perpendicular side sections of the stake has a bent-over upper end tab which forms with upper portions of such side sections a recessed area in which the outlet end of the extension hose is disposed and protected. The tab defines a broadened upper end surface of the stake against which a hand may be placed to easily push the sharpened lower end of the stake into the ground. Additionally, the tab may be easily grasped and upwardly pulled to remove the stake from the ground.

17 Claims, 2 Drawing Sheets

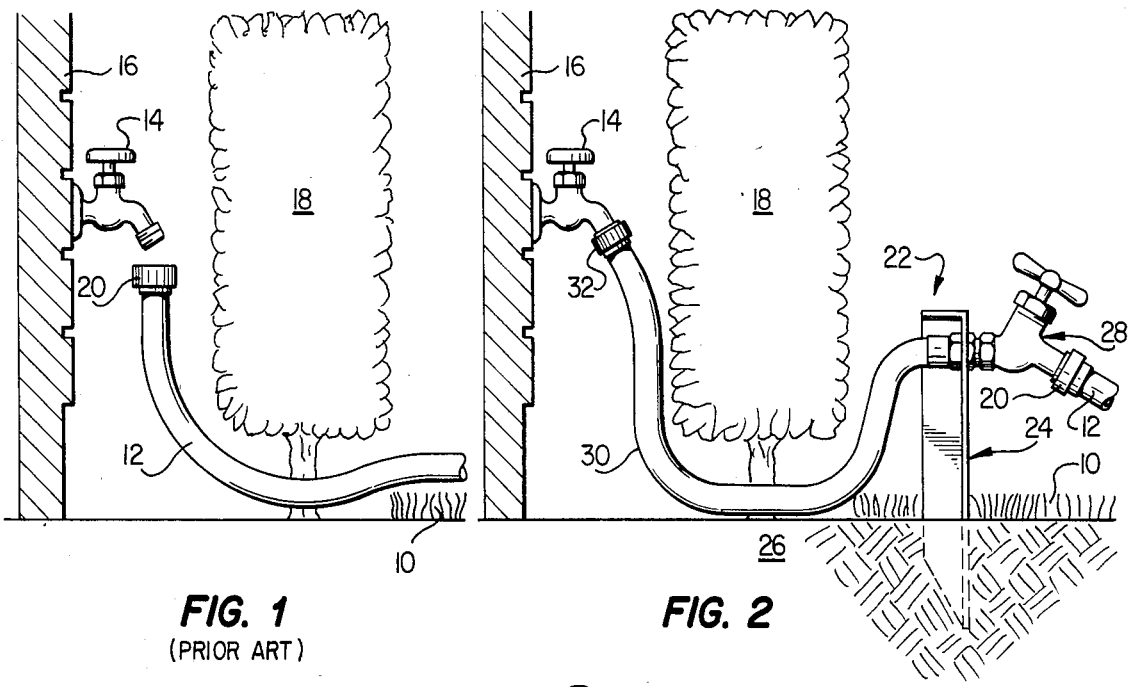
FIG. 1 (PRIOR ART)
FIG. 2
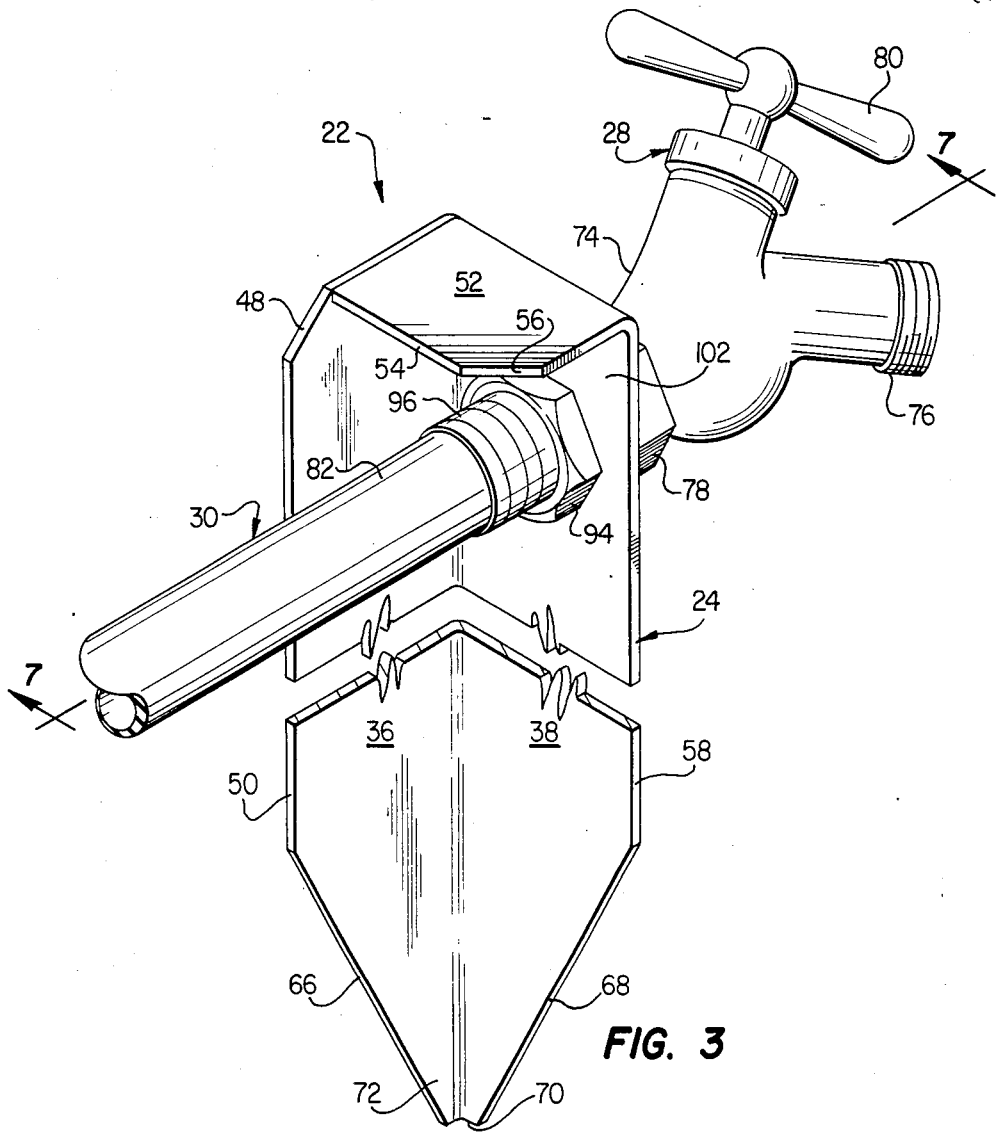
FIG. 3

HEDGE HOSE BIBB EXTENSION APPARATUS

BACKGROUND OF THE INVENTION

The present invention relates generally to fluid flow control apparatus, and more particularly provides a unique hose bibb extension assembly which is connectable to a hose bibb disposed behind obstructive foliage, such as a hedge or the like, to provide a watering hose connection and water flow control point more conveniently positioned in front of the foliage.

Decorative ground foliage, such as shrubbery, hedges or the like, is often planted along an edge portion of a lawn positioned adjacent an exterior wall of a residence or commercial building. In the absence of an underground lawn sprinkling system, to water the lawn it is usually necessary to connect a garden hose to a wall-mounted hose bibb disposed behind the obstructive foliage. As is well known, this can be an awkward and difficult task requiring that the hose be snaked under, through, or over the foliage to connect it to the hose bibb which must then be turned on and off while reaching through or around the foliage to start and stop water flow to the garden hose. After the watering of the lawn is completed, the similarly awkward and difficult task of turning the hose bibb off and disconnecting the hose must be performed so that the hose can be carried away and stored.

It is accordingly an object of the present invention to provide extension apparatus, connectable to a hose bibb positioned behind obstructive foliage, which eliminates or minimizes the hose attachment and water flow control access problems heretofore posed by such foliage.

SUMMARY OF THE INVENTION

In carrying out principles of the present invention, in accordance with a preferred embodiment thereof, a unique hose bibb extension assembly is provided which may be connected to a hose bibb disposed behind obstructive foliage such as a hedge or the like, and left in place for extended periods of time to provide a garden hose connection location and a water flow control point which are conveniently positionable in front of the foliage.

The assembly includes a specially designed mounting stake which may be pushed into the ground in front of the hedge, and an auxiliary hose bibb having an inlet fitting threaded onto a hose barb fitting that is anchored to an upper end portion of the stake. An inner end portion of a relatively short length of high pressure extension hose is clamped to the hose barb fitting and has an outer or inlet end which is connectable to the primary, wall-mounted hose bibb behind the hedge. With the stake pushed into the ground in front of the hedge, and with the primary hose bibb turned on and left on, the auxiliary hose bibb is mounted in a convenient, elevated position and may be used to control water flow through an ordinary garden hose connected thereto.

When the lawn watering task is completed, the garden hose may be removed from the auxiliary hose bibb, carried away and stored as usual. The mounting stake may then be either left in place, or removed from the ground and, with the auxiliary hose bibb and an outer end portion of the extension hose, be neatly tucked away in an out of sight location beneath a forward side portion of the hedge for subsequent use without the necessity of reaching under, through or over the hedge to the primary hose bibb behind it.

The mounting stake has, along its length, a generally L-shaped cross-section defined by two relatively wide, perpendicularly disposed side sections of the stake body, a lower end portion of the stake body being suitably sharpened to facilitate the insertion of the stake into the ground. One of the side sections of the stake has, along its upper end, a tab portion which is transversely bent to partially close the upper end of the stake. This bent tab portion defines with upper end portions of the stake side sections a recessed area within the stake body within which the outlet end of the extension hose is disposed at its connection to the hose barb fitting. The bent tab member thus cooperates with upper end portions of the stake side sections to shield and protect the outlet end of the extension hose.

The bent tab at the upper end of the stake also forms a convenient, widened force surface against which the palm of a hand may be placed to more easily push the sharpened stake into the ground. The tab may also be easily grasped and pulled upwardly to assist in pulling the stake out of the ground.

The generally L-shaped cross-section of the stake, defined by the mutually perpendicular side sections thereof, provides the stake with a considerable degree of structural rigidity. Additionally, the portions of these relatively wide side sections disposed in the ground form angularly disposed bearing surfaces therein which firmly resist pivoting or tilting of the stake in any direction to thereby securely anchor the auxiliary hose bibb in its elevated position.

The extension assembly is of an uncomplicated yet rugged construction, and is relatively inexpensive to manufacture from simple components which can be easily obtained and/or fabricated. In sum, the assembly provides a novel, useful and long-needed addition to the typical hose-based lawn watering system, and essentially eliminates the primary hose bibb access problems heretofore posed by hedges and other obstructing foliage.

BRIEF DESCRIPTION OF THE DRAWINGS

FIG. 1 is an elevational view of a hose bibb connected to the exterior wall of a building and positioned directly behind decorative shrubbery closely adjacent the wall, and illustrates the access problem typically encountered in connecting and disconnecting a garden hose to the hose bibb, and turning the hose bibb on and off;

FIG. 2 is an elevational view similar to that in FIG. 1 but illustrating a novel solution to the hose bibb access problem afforded by the present invention via its provision of unique hose bibb extension apparatus;

FIG. 3 is an enlarged scale, fragmentary perspective view of the extension apparatus in which a specially designed mounting stake portion thereof has been longitudinally foreshortened;

DETAILED DESCRIPTION

Figures 4, 5, 6:
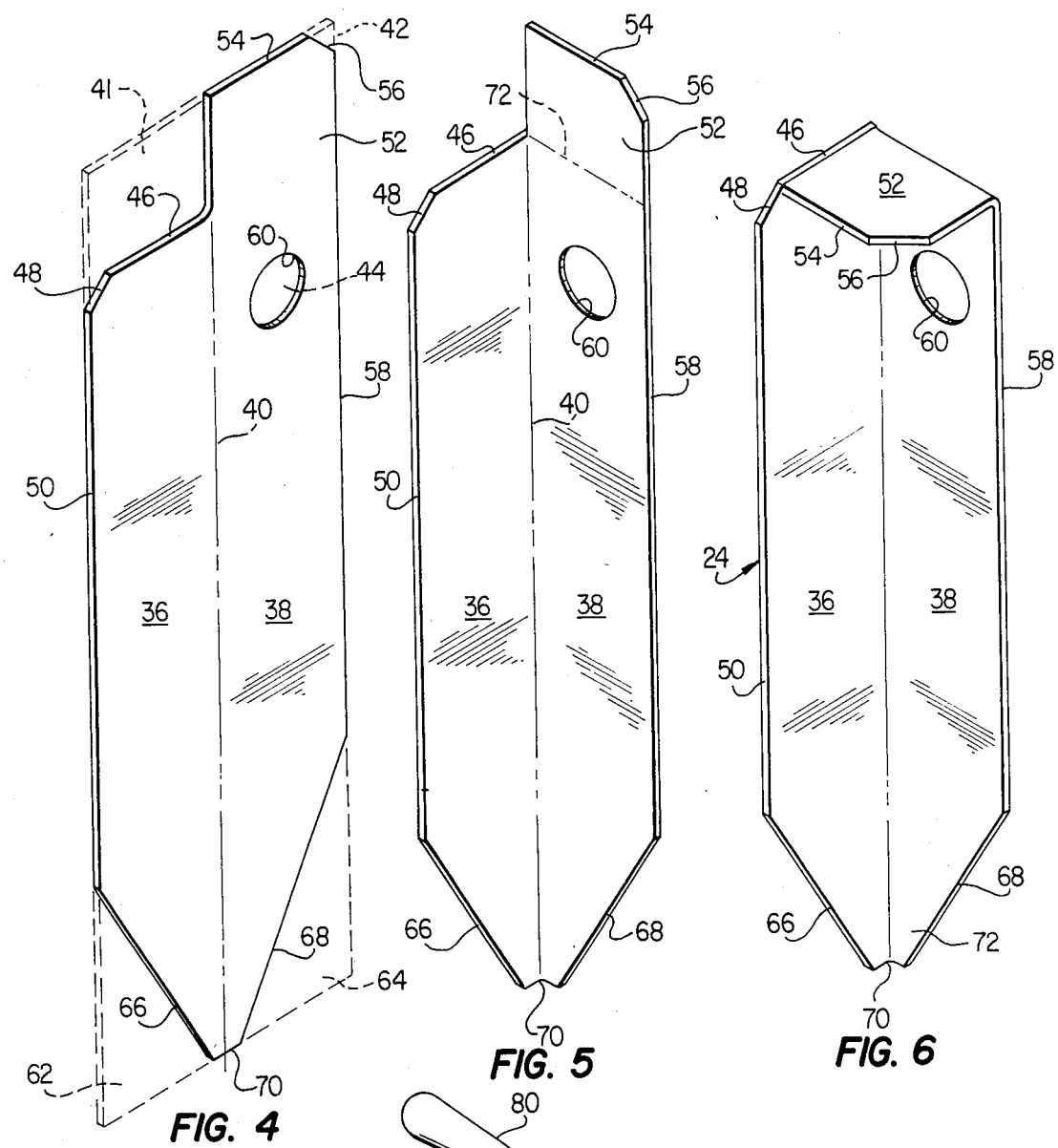
FIGS. 4, 5 and 6 are reduced scale perspective views sequentially illustrating the fabrication of the mounting stake.

FIG. 1 illustrates an annoying access problem routinely faced by homeowners who must periodically water their lawn 10 by connecting an ordinary garden hose 12 to a hose bibb 14 mounted on an exterior wall 16 of their home. The problem is created by decorative ground foliage, such as the representative hedge 18, positioned closely adjacent the wall 16 in front of the hose bibb. To water the lawn 10, it is necessary to snake the hose bibb connection end 20 of the hose 12 under, through or over the hedge 18, screw the end 20 onto the hose bibb, and then turn the water on. As is well known, this can be an awkward and difficult task. Additionally, when the lawn watering has been completed, it is often necessary to crawl under, reach through or reach over the hedge 18 to turn the water off, and uncouple the hose 12 from the hose bibb so that the hose can be removed, carried away and stored until it is needed again.

Referring now to FIG. 2, the present invention uniquely solves this bothersome hose bibb access problem by providing a hose bibb extension assembly 22 which, as will be seen, advantageously creates a water flow control point, and a garden hose connection point, conveniently positioned in front of the hedge 18. Assembly 22 includes a specially designed mounting stake 24 which may be easily pushed or driven into the ground 26 in front of the hedge 18, an auxiliary hose bibb 28 firmly anchored to an upper end portion of the stake, and a relatively short length (preferably about a five to six foot length) of high pressure extension hose 30 (preferably having an internal burst strength on the order of about 400 psi) which is coupled at one end to the inlet of the auxiliary hose bibb 28 and is provided at its opposite end with a suitable internally threaded connection collar 32 removably securable to the "primary" hose bibb 14 on wall 16 behind the obstructing hedge.

To use the assembly 22, the auxiliary hose bibb 28 is turned off, the outer end of the extension hose 30 is run beneath the hedge 18, and the connection collar 32 is threaded onto the primary hose bibb 14 which is then turned on and left on. Next, the stake 24 is pushed into the ground 26 at a suitable location in front of the hedge 18 to anchor the auxiliary hose bibb 28 in a convenient, elevated position. Finally, the connection end 20 of the main hose 12 is operatively secured to the outlet end of the hose bibb 28 which may be then opened to create a flow of water from the primary hose bibb 14 to the outlet end of the main hose 12.

Importantly, when the watering of the lawn 10 is finished, the conveniently positioned auxiliary hose bibb 28 may be turned off so that the main hose 12 may be removed therefrom, carried away and stored. No further difficult and awkward access to the primary hose bibb 14 is required. It can simply be left on, and the auxiliary hose bibb 28 used as the valve means for controlling water flow through the hose bibb 14. The stake 24 may be left in place in the ground 26 to hold the hose bibb 28 in an elevated, easily visible and accessible location for subsequent connections of the main hose 12 thereto.

Alternatively, the stake may be pulled out of the ground and, along with the right end portion of the extension hose 30, neatly tucked away beneath a front side portion of the hedge 18 in an out of sight location until needed again. During the intervals between lawn waterings, pressurized water will, of course, remain in the extension hose 30. However, due to the high pressure capability of this hose segment, it will not be damaged by even lengthy periods of such internal pressurization. When it is desired to use the apparatus 22 again, the stake 24 is simply removed from its stored location under or closely adjacent the front of the hedge 18 and again driven into the ground 26 to anchor the auxiliary hose bibb 28 in a convenient elevated position in front of the hedge.

As can be seen from the foregoing general operational description, the assembly 22 of the present invention essentially eliminates the hose bibb access problem heretofore posed by decorative foliage such as the hedge 18. The only time that access to the wall-mounted hose bibb 14 is required is during the initial connection thereto of the extension hose 30 and during the disconnection of the extension hose when the assembly 22 needs to be removed during periods of winter storage.

The specially designed mounting stake 24 (FIG. 3) may be conveniently formed from a single elongated rectangular plate 34 of 16 gauge hot rolled steel as sequentially illustrated in FIGS. 4–6, the plate 34 having lateral side sections 36 and 38 positioned on opposite sides of the central longitudinal axis 40 of the plate. In a first punching operation, three areas 41, 42 and 44 are removed from an upper end portion of the plate 34. The removed area 41 is an upper end portion of the side section 36 and, when removed, defines an axially inset upper end edge 46 on the side section 36, the upper end edge 46 having a beveled outer corner portion 48 adjacent the outer side edge 50 of the side section 36. Removal of the plate area 41 also defines in the side section 38 an upper end tab portion 52 which projects upwardly beyond the upper end edge 46 of side section 36 and has itself an upper end edge 54.

The removed pate area 42 is triangularly configured and forms a small beveled area 56 at the juncture of the upper end edge 54 and the outer side edge 58 of the side section 38. The corner bevels 48 and 56 are formed simply to remove sharp corner areas from the upper end of the finished stake 24.

The removed plate area 44 defines in the stake body a circular mounting hole 60 which is laterally centered in the side section 38 and is positioned somewhat below the level of the upper end edge 46 of side section 36.

In a second punching operation, triangular areas 62 and 64 are removed from lower end portions of the side sections 36 and 38 to form downwardly and laterally inwardly sloping portions 66 and 68 of the outer side edges 50 and 58 which inwardly terminate at a narrow flattened lower end portion 70 of the stake body.

Figures 7, 8:
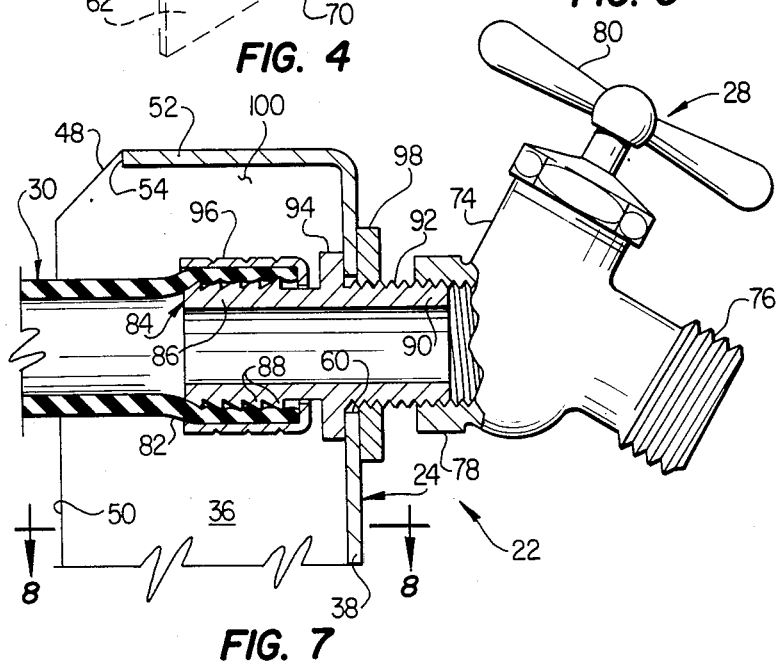
FIG. 7 is an enlarged scale fragmentary cross-sectional view, partially in elevation, taken through the extension apparatus along line 7—7 of FIG. 3.
FIG. 8 is a cross-sectional view through the mounting stake along line 8—8 of FIG. 7.

After these two punching operations have been performed, the partially completed stake body is bent about its central longitudinal axis 40 (FIG. 5) to bring the lateral side sections 36 and 38 into a generally perpendicular relationship as also illustrated in FIG. 8.

Next, the upper end tab 52 is bent leftwardly toward the outer side edge 50 of the side section 36, about a bend line 72, until the tab is perpendicular to its associated side section 38 and the upper end edge 54 of the tab is positioned inwardly adjacent the corner bevel 48 (see FIG. 7) and the upper side surface of the tab is generally aligned with the upper end edge 46 of the side section 36 as illustrated in FIG. 6. As can also be seen in FIG. 6, the bent-over tab 52 partially closes the upper end of the formed stake member 24, and the sloped side edge portions 66 and 68 define a sharpened lower end portion 72 in the body of the stake 24. After the stake 24 is formed in this manner, it is subjected to a hot dip zinc galvanizing process to inhibit corrosion thereof.

Referring now to FIGS. 3 and 7, the auxiliary hose bibb 28 is of generally conventional construction and has an angled body portion 74, an externally threaded outlet fitting 76 to which the inlet end 20 of the main hose 12 (FIG. 2) may be threadingly coupled, an internally threaded inlet fitting 78 having a hexagonal external configuration permitting it to be tightened onto a threaded male fitting, and a valve handle 80.

Auxiliary hose bibb 28 is coupled to an inner end portion 82 of the high pressure extension hose 30 and firmly anchored to the support stake 24, by means of an elongated, hollow cylindrical hose barb fitting 84 (FIG. 7). A left end portion 86 of the fitting 84 is provided around its periphery with a series of annular, triangularly cross-sectioned barb portions 88, while a right end portion 90 of the fitting 84 is externally threaded as at 92. Formed on the fitting 84 between these end portions 86 and 90 is an external, hexagonally crosssectioned tightening flange 94.

In assembling the extension apparatus 22, the inner extension hose end 82 is forced over the barbed portion 86 of the fitting 84, and a clamping band 96 is tightened around the hose end 82 to drive the barbs 88 into the interior surface of the hose end and hold it on the fitting end portion 86. The threaded fitting end portion 90 is then inserted outwardly through the mounting hole 60 in the stake member side section 38, and a lock nut 98 is tightened onto the outwardly projecting threaded portion 90 until a portion of the stake member side section 38 surrounding the mounting hole 60 is firmly clamped between the tightening flange 94 and the lock nut 98, thereby securely anchoring the hose barb fitting 84 to an upper end portion of the stake member 24 positioned downwardly from the bent-over upper end tab 52. Finally, the hose bibb inlet fitting 78 is tightened onto the outwardly projecting threaded end portion 90 of the fitting 84, and sealed thereto with an appropriate caulking material, to thereby anchor the hose bibb 28 to the stake member 24.

The bent-over upper end tab 52 performs several useful functions in the completed assembly 22. First, it forms a convenient, widened force surface which facilitates the manual insertion of the stake 24 into the ground. Specifically, it provides an extended upper end surface of the stake 24 upon which the palm of a hand may be comfortably rested to push the sharpened stake end 72 into the ground.

Second, the tab 52 also facilitates the manual removal of the stake 24 from the ground. By simply inserting several fingers into the space 100 between the tab 52 and the inner extension hose end 82, the tab 52 may be conveniently grasped and pulled upwardly to remove the stake from the ground.

Third, it can be seen in FIG. 3 that the tab 52 defines with upper end portions of the stake side sections 36 and 38 an upper end recess area 102 in the stake 24 within which the extension hose coupling structure is sheltered and protected to a large extent from damage. Despite this advantageous protective aspect, the recess 102 is configured to permit easy wrench access to the tightening flange 94 in the event it is necessary to remove the fitting 84 from the stake 24. As best illustrated in FIG. 7, the valve handle 80 of the auxiliary hose bibb 28 is positioned laterally outwardly of the stake side section 38, and somewhat upwardly of the tab 52, so that it may be conveniently grasped and rotated without the operator's hand coming in contact with any portion of the stake 24.

The generally L-shaped cross-section of the stake body defined by the mutually perpendicular side sections 36 and 38 thereof provides the stake with a considerable degree of structural rigidity, and additionally functions to strongly resist pivotal motion of the stake about its longitudinal axis, or side to side tilting of the stake, in the ground 26. Specifically, the portions of these relatively wide side sections 36 and 38 disposed in the ground form angularly disposed bearing surfaces therein which firmly resist pivoting or tilting of the stake in any direction to thereby securely anchor the auxiliary hose bibb 28 in its convenient, elevated position. Despite the advantageous firmness with which the stake supports the auxiliary hose bibb, the stake is very easily removed from the ground simply by grasping and pulling upwardly on the tab 52 as previously described.

It can be seen from the foregoing that the extension assembly 22 uniquely solves the primary hose bibb access problems heretofore created by adjacent foliage such as the hedge 18. The assembly 22 is of an uncomplicated yet rugged construction, and is relatively inexpensive to manufacture from simple components which can be easily obtained and/or fabricated.

The foregoing detailed description is to be clearly understood as being given by way of illustration and example only, the spirit and scope of the present invention being limited solely by the appended claims.

What is claimed is:

1. Water flow extension apparatus connectable to a primary hose bibb disposed behind obstructive foliage, comprising:

valve means for controlling water flow, said valve means having an inlet, and an outlet connectable to a garden hose;

an elongated stake member having a lower end portion drivable into the ground in front of the foliage, and an upper end portion; and coupling means for fixedly securing said valve means to said upper end portion of said stake member and for coupling said inlet of said valve means to the outlet end of an extension hose having an inlet end connectable to the outlet of said primary hose bibb, whereby, with said stake member driven into the ground in front of the foliage, an extension hose interconnected between said coupling means and the outlet of the primary hose bibb, and the primary hose bibb being initially turned on and left on, said valve means are held in an elevated position in front of the foliage and may be used in place of the primary hose bibb to control water flow to a garden hose connected to the outlet of said valve means.

2. The extension apparatus of claim 1 wherein:
said valve means comprise an auxiliary hose bibb.

3. The extension apparatus of claim 1 further comprising:
a length of extension hose having an outlet end connected to said coupling means, and an inlet end connectable to the outlet of the primary hose bibb.

4. The extension apparatus of claim 3 wherein:
said length of extension hose has a sufficiently high internal pressure rating to permit it to remain interconnected between the primary hose bibb and said valve means for extended periods of time, with the primary hose bibb turned on and said valve means turned off, without internal pressure damage thereto.

5. The extension apparatus of claim 4 wherein: said internal pressure rating is approximatley 400 psi.

6. The extension apparatus of claim 1 wherein: said elongated stake member has a longitudinal axis, and
said lower end portion of said stake member has a duality of outwardly projecting side portions configured to inhibit side-to-side tilting of said stake member, and rotation of said stake member about said longitudinal axis, when said lower end portion is driven into the ground.

7. The extension apparatus of claim 6 wherein: said duality of outwardly projecting side portions are generally perpendicular to one another.

8. The extension apparatus of claim 1 wherein: said upper end portion of said stake member defines a recess which receives and shields a portion of said coupling means to which the outlet end of the extension hose may be connected.

9. The extension apparatus of claim 8 wherein: said upper end portion has a duality of generally perpendicular side sections and an end section extending laterally across said stake member at the upper ends of said side sections, said side sections and said end section defining said recess, said end section being configured to be manually grasped and pulled to facilitate removal of said stake member from the ground, and to be manually pushed to facilitate insertion into the ground of said stake member.

10. Valved water delivery apparatus connectable to a primary hose bibb positioned behind obstructive foliage, such as a hedge or the like, to provide a water flow control point conveniently positioned in front of the foliage, said apparatus comprising:
elongated stake means, drivable into the ground in front of the foliage, for supporting an auxiliary hose bibb in an elevated position, said stake means having an upper end portion;
an auxiliary hose bibb having an inlet, and an outlet connectable to a garden hose;
a length of extension hose having an outlet end, and an inlet end connectable to the outlet of the primary hose bibb;
coupling means interconnected between said outlet end of said length of extension hose and said inlet of said auxiliary hose bibb for establishing fluid communication therebetween;
anchor means for securely anchoring said coupling means to said upper end portion of said stake means; and
mutually angled, laterally outwardly projecting stabilizing means, associated with a lower end portion of said stake means, for inhibiting side-to-side tilting of said stake means, and rotation about a longitudinal axis thereof, in the ground.

11. Valved water delivery apparatus connectable to a primary hose bibb positioned behind obstructive foliage, such as a hedge or the like, to provide a water flow control point conveniently positioned in front of the foliage, said apparatus comprising:
elongated stake means, drivable into the ground in front of the foliage, for supporting an auxiliary hose bibb in an elevated position, said stake means having an upper end portion;
an auxiliary hose bibb having an inlet, and an outlet connectable to a garden hose;
a length of extension hose having an outlet end, and an inlet end connectable to the outlet of the primary hose bibb;
coupling means interconnected between said outlet end of said length of extension hose and said inlet of said auxiliary hose bibb for establishing fluid communication therebetween;
anchor means for securely anchoring said coupling means to said upper end portion of said stake means;
mutually angles, laterally outwardly projecting stabilizing means, associated with a lower end portion of said stake means, for inhibiting side-to-side tilting of said stake means, and rotation about a longitudinal axis thereof, in the ground; and
protective means, defined by said upper end portion of said stake means, for forming a recessed area in said stake means that receives and shelters a portion of said coupling means connected to said outlet end of said length of extension hose, said protective means having an upper end section extending generally perpendicularly to the length of said stake means and being configured to be manually pushed to facilitate insertion of said stake means into the ground, and manually grasped and pulled to facilitate removal of said stake means from the ground.

12. Valved water delivery apparatus connectable, to a primary hose positioned behind obstructive foliage, such as a hedge or the like, to provide a water flow control point conveniently positioned in front of the foliage, said apparatus comprising:
elongated stake means, drivable into the ground in front of the foliage, for supporting an auxiliary hose bibb in an elevated position, said stake means having an upper end portion;
an auxiliary hose bibb having an inlet, and an outlet connectable to a garden hose;
a length of extension hose having an outlet end, and an inlet end connectable to the outlet of the primary hose bibb;
coupling means interconnected between said outlet end of said length of extension hose and said inlet of said auxiliary hose bibb for establishing fluid communication therebetween;
anchor means for securely anchoring said coupling means to said upper end portion of said stake means; and
mutually angled, laterally outwardly projecting stabilizing means, associated with a lower end portion of said stake means, for inhibiting side-to-side tilting of said stake means, and rotation about a longitudinal axis thereof, in the ground,
said stake means including an elongated stake member having:
an elongated, plate-like body laterally bent along a longitudinal axis thereof to position first and second opposite lateral side sections of said body in a generally perpendicular relationship, each of said side sections having inner and outer side surfaces, upper and lower ends, and outer side edges, said outer side edges having downwardly and laterally inwardly sloped lower end portions which form on said body a sharpened lower end portion adapted to be driven into the ground, an upper end tab portion formed on said first lateral side section and extending transversely thereto toward the outer side edge of said second lateral side section adjacent the upper end of said second lateral side section, and a mounting opening formed through one of said lateral side sections below said upper end tab portion, and said coupling means include a coupling member extending through said mounting opening and having a first portion positioned below said upper end tab and connected to said outlet end of said length of extension hose, and a second portion projecting outwardly through said mounting opening and connected to said inlet of said auxiliary hose bibb.

13. The apparatus of claim 12 wherein:

said coupling member is a hollow cylindrical hose barb fitting extending axially through said mounting opening, said hose barb fitting having a barbed inner end portion received in said outlet end of said length of extension hose and positioned below said upper end tab portion, and a threaded outer end portion projecting outwardly through said mounting opening and threadingly secured to said inlet of said auxiliary hose bibb.

14. The apparatus of claim 13 wherein said anchor means include:

an external tightening flange member formed around the periphery of a longitudinally intermediate portion of said hose barb fitting and engaging said inner side surface of said one of said lateral side sections, and a lock nut threaded onto said threaded outer end portion of said hose barb fitting and tightened against said outer side surface of said one of said lateral side sections.

15. The apparatus of claim 13 wherein said coupling means further include:

a clamping band member circumscribing said outlet end of said length of extension hose and holding its inner surface in locking engagement with said inner end portion of said hose barb fitting.

16. Valved water delivery apparatus connectable to a primary hose bibb positioned behind obstructive foliage, such as a hedge or the like, to provide a water flow control point conveniently positioned in front of the foliage, said apparatus comprising:

elongated stake means, drivable into the ground in front of the foliage, for supporting an auxiliary hose bib in an elevated position, said stake means having an upper end portion;

an auxiliary hose bibb having an inlet, and an outlet connectable to a garden hose;

a length of extension hose having an outlet end, and an inlet end connectable to the outlet of the primary hose bibb;

coupling means interconnected between said outlet end of said length of extension hose and said inlet of said auxiliary hose bibb for establishing fluid communication therebetween;

anchor means for securely anchoring said coupling means to said upper end portion of said stake means; and mutually angled, laterally outwardly projecting stabilizing means, associated with a lower end portion of said stake means, for inhibiting side-to-side tilting of said stake means, and rotation about a longitudinal axis thereof, in the ground; and said length of extension hose having a sufficiently high internal burst strength to permit it to remain interconnected between the primary hose bibb and said coupling means for extended periods of time, with the primary hose bibb turned on and said auxiliary hose bibb turned off, without internal water pressure damage thereto.

17. The apparatus of claim 16 wherein:

said internal burst strength is approximately 400 psi.

* * * * *